(12) United States Patent
Lin et al.

(10) Patent No.: US 10,793,016 B2
(45) Date of Patent: Oct. 6, 2020

(54) AUTOMATIC PARKING SYSTEM WITH CHARGING FUNCTION AND PARKING AND CHARGING METHOD THEREOF

(71) Applicant: Guangdong Weichuang Wuyang Intelligent Equipment Co., Ltd., Dongguan (CN)

(72) Inventors: Weitong Lin, Dongguan (CN); Yungao Hu, Dongguan (CN); Yongjin Guo, Dongguan (CN); Pin Cao, Dongguan (CN)

(73) Assignee: GUANGDONG WEICHUANG WUYANG INTELLIGENT EQUIPMENT CO., LTD., Dongguan (CN)

( * ) Notice: Subject to any disclaimer, the term of this patent is extended or adjusted under 35 U.S.C. 154(b) by 39 days.

(21) Appl. No.: 16/165,674

(22) Filed: Oct. 19, 2018

(65) Prior Publication Data

US 2019/0054832 A1  Feb. 21, 2019

(30) Foreign Application Priority Data

Mar. 1, 2018  (CN) .......................... 2018 1 0172369

(51) Int. Cl.
*B60L 53/36* (2019.01)
*E04H 6/22* (2006.01)
*B60L 53/16* (2019.01)
*H02J 7/00* (2006.01)

(52) U.S. Cl.
CPC .............. *B60L 53/36* (2019.02); *B60L 53/16* (2019.02); *E04H 6/22* (2013.01); *H02J 7/0027* (2013.01); *H02J 7/0042* (2013.01); *Y02T 10/70* (2013.01)

(58) Field of Classification Search
CPC .. B60L 53/36; B60L 53/16; E04H 6/22; H02J 7/0027; H02J 7/0042
USPC ...................................................... 320/109
See application file for complete search history.

(56) References Cited

U.S. PATENT DOCUMENTS 4,039,089 A * 8/1977 Kochanneck ........... E04H 6/287
                                                414/256
2017/0226764 A1* 8/2017 Nussbaum ................ E04H 6/18

* cited by examiner

*Primary Examiner* — Suresh Memula
(74) *Attorney, Agent, or Firm* — Shimokaji IP

(57) ABSTRACT

An automatic parking system with charging function includes an in-out space, parking levels, loading boards, and a conveyer. Each parking level includes parking spaces, each parking space has a charging pile and a power supply interface electrically connected with the charging pile. Each loading board includes a board portion, a power receiving interface, a charging cable for charging the electric vehicle, and a support foot. The conveyer includes a lifting platform and an automated guided vehicle, the automated guided vehicle is configured to drive into a position under the board portion and support the loading board upward so as to carry the loading board, when the loading board is carried to a predetermined position of the corresponding parking space, the automated guided vehicle is lowered to make the support foot be supported on the corresponding parking space and the power receiving interface mate with the corresponding power supply interface.

11 Claims, 5 Drawing Sheets

AUTOMATIC PARKING SYSTEM WITH CHARGING FUNCTION AND PARKING AND CHARGING METHOD THEREOF

CROSS-REFERENCE TO RELATED APPLICATIONS

This application claims the benefits of Chinese Patent Application No. 201810172369.9, filed on Mar. 1, 2018, which is hereby incorporated by reference in this application.

FIELD OF THE INVENTION

The present invention relates to an automatic parking system, and more particularly to an automatic parking system with charging function and a parking and charging method thereof.

BACKGROUND OF THE INVENTION

With the rapid development of the economy, in order to reduce environmental pollution, the state strongly advocates the development of new energy sources, therefore, more and more electric vehicles appear. At present, the charging ways for the electric vehicles are mainly by household sockets. However, the charging time of the household socket is two long, and the electric vehicles on the road are prone to be unable to run due to the lack of electricity, which brings the difficulty in charging the electric vehicles.

SUMMARY OF THE INVENTION

A first objective of the present invention is to provide an automatic parking system with charging function, which can park and charge a plurality of electric vehicles so as to make the electric vehicles be charged easier.

A second objective of the present invention is to provide a parking and charging method of the automatic parking system with charging function, which can park and charge a plurality of electric vehicles so as to make the electric vehicles be charged easier.

To achieve the above-mentioned first objective, an automatic parking system with charging function includes: an in-out space, a plurality of parking levels, a plurality of loading boards, and a conveyer, each parking level includes a plurality of parking spaces, each parking space has a charging pile and a power supply interface electrically connected with the charging pile disposed therein; each loading board includes a board portion for supporting an electric vehicle thereon, a power receiving interface disposed at the board portion, a charging cable electrically connected with the power receiving interface for charging the electric vehicle supported on the board portion, and a support foot disposed at a bottom of the board portion; the conveyer is configured for transporting the loading board between the in-out space and the parking spaces, the conveyer includes a lifting platform for carrying the loading board up and down and a liftable automated guided vehicle, the automated guided vehicle is configured to drive to a position under the board portion and support the loading board upward so as to carry the loading board, when the loading board is carried to a predetermined position of the corresponding parking space, the automated guided vehicle is lowered to make the support foot be supported on the corresponding parking space and the power receiving interface move downward to mate with the corresponding power supply interface.

Preferably, the power receiving interface is a power plug disposed at the board portion, the power supply interface is a power socket box.

Preferably, the power plug includes a plurality of conductive pins, the power socket box includes a plurality of conductive sleeves, the conductive pins are configured to be inserted into the conductive sleeves, respectively.

Preferably, each of the conductive sleeves has a first spring disposed therein, each of the conductive pins has a second spring disposed thereon, when the conductive pins are inserted into the corresponding the conductive sleeves, the conductive pins compress the corresponding first springs, and the conductive sleeves compress the corresponding second springs.

Preferably, the automatic parking system with charging function further includes at least one charging control box which is connected to an external power supply network and electrically connected with the power supply interface.

Preferably, the charging control box is connected with the power supply interface by a power cable.

Preferably, each of the parking levels has the respective automated guided vehicle disposed therein.

To achieve the above-mentioned second objective, a parking and charging method of the automatic parking system with charging function includes: connect the charging cable to a charging port of the electric vehicle parked on the loading board positioned in the in-out space by the lifting platform; carry the loading board with the electric vehicle supported thereon to the corresponding parking level by the lifting platform; lift the automated guided vehicle under the loading board to support the loading board; carry the loading board to the corresponding parking space by the automated guided vehicle; lower the automated guided vehicle to make the supporting foot be supported on the corresponding parking space and make the power receiving interface move downward to mate with the corresponding power supply interface, when the loading board is carried to a predetermined position of the corresponding parking space; charge the electric vehicle by the charging pile, once detecting that the power receiving interface and the corresponding power supply interface are mated with each other.

Preferably, the parking and charging method further includes: power off the charging pile, once detecting that the electric vehicle is charged completely.

Preferably, the parking and charging method further includes: power off the charging pile, once receiving a vehicle unparking order.

Preferably, the parking and charging method further includes: enable the automated guided vehicle drive into the corresponding parking space and then be lifted to make the corresponding loading board move upward and the power receiving interface be separated from the corresponding power supply interface, once receiving a vehicle unparking order.

In comparison with the prior art, the automatic parking system with charging function of the present invention only needs to drive the electric vehicle into the in-out space and connect the charging cable to the electric vehicle, then the lifting platform will carry the loading board with the electric vehicle thereon to the corresponding parking level, then the automated guided vehicle is lifted to support the loading board and then carries the loading board to the corresponding parking space, when the loading board is carried to a predetermined position of the corresponding parking space, the automated guided vehicle is lowered to make the support foot be supported on the corresponding parking space and the power receiving interface move downward to mate with the corresponding power supply interface, then the charging pile will charge the corresponding electric vehicle. When unparking the electric vehicle, the automated guided vehicle and the lifting platform will carry the corresponding electric vehicle to the in-out space once receiving a vehicle unparking order. Therefore, the automatic parking system with charging function of the present invention can park and charge multiple electric vehicle simultaneously, which solves the problem that the electric vehicles are difficult to be charged.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
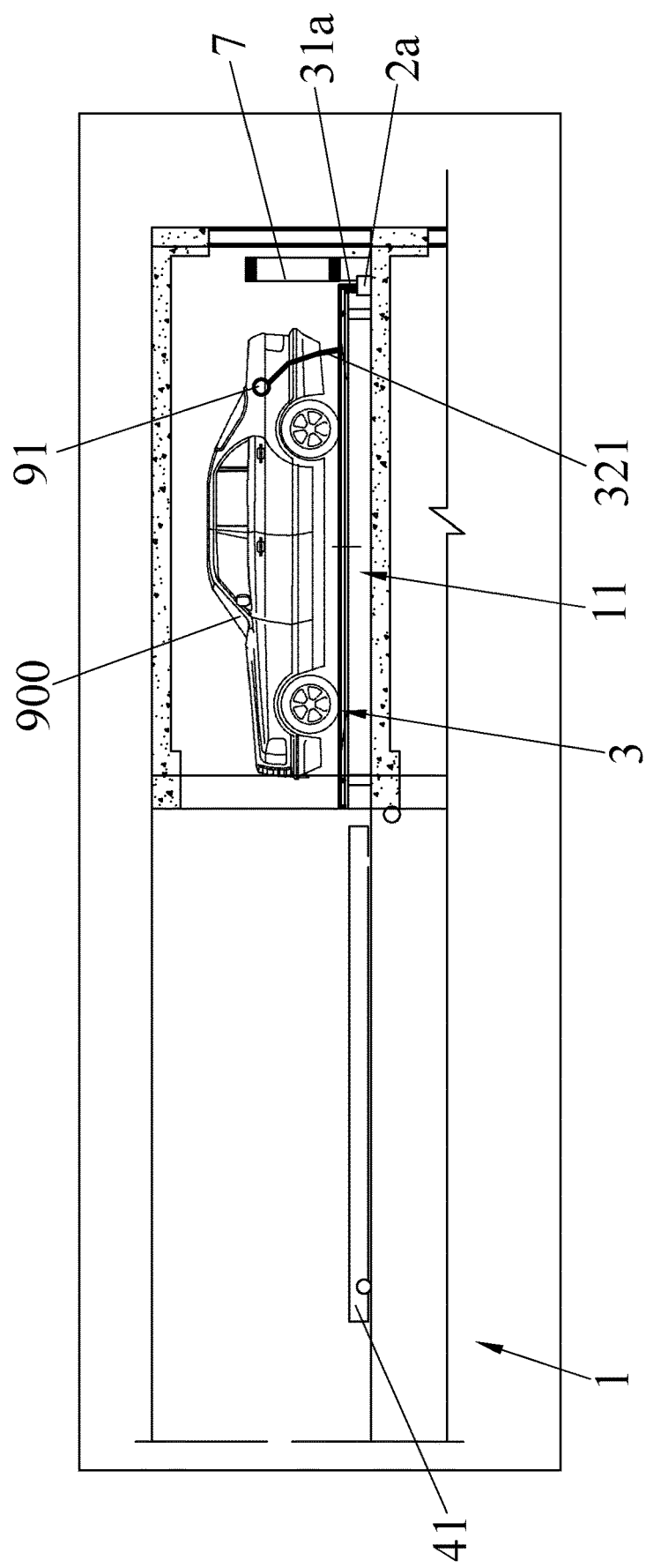
FIG. 1 is a perspective view of a parking level of an automatic parking system with charging function according to an embodiment of the present invention, with electric vehicles parked in parking spaces thereof.
Figure 2:
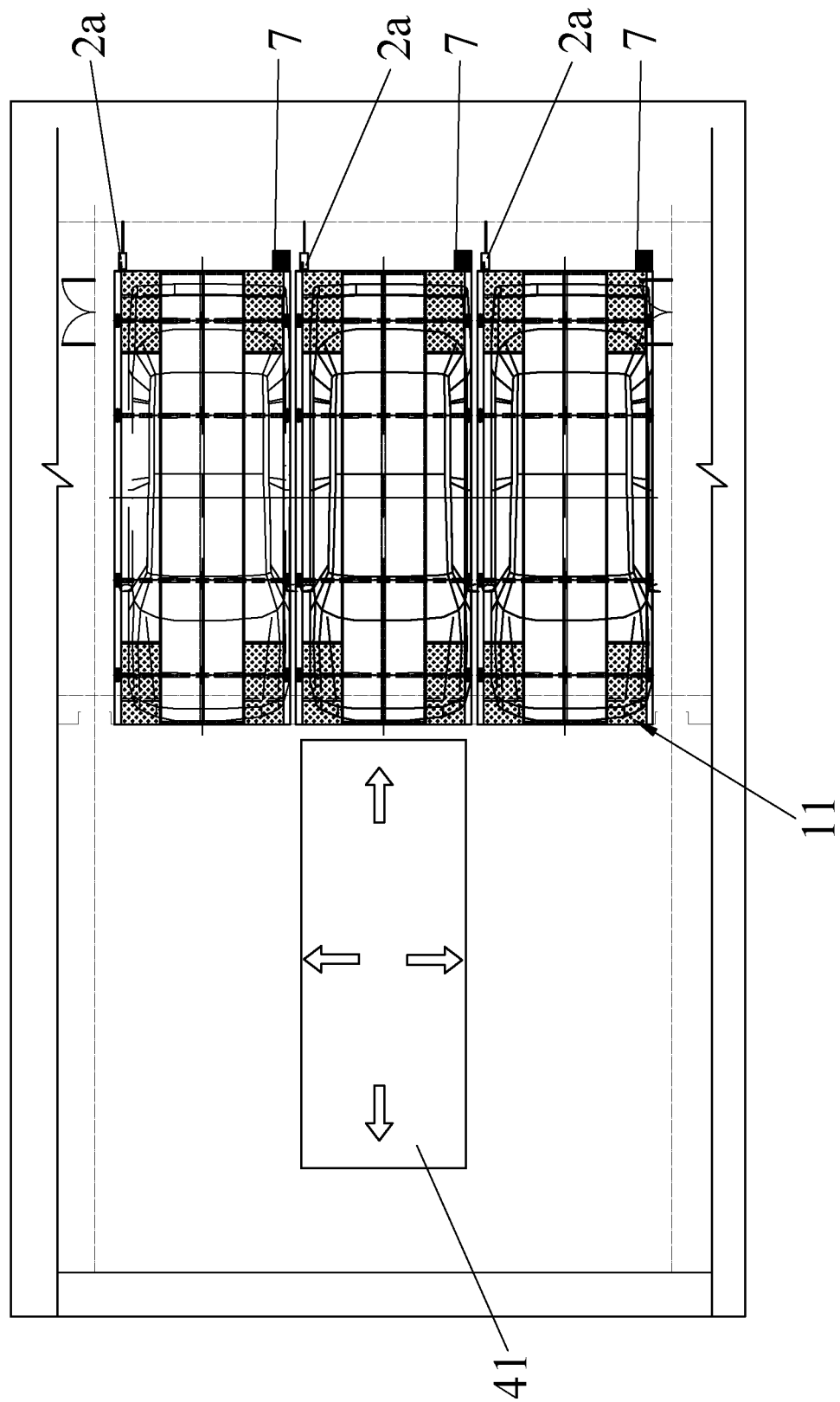
FIG. 2 is a top plan view of FIG. 1.

A distinct and full description of the technical solution of the present invention will follow by combining with the accompanying drawings.

Referring to FIGS. 1-5, an automatic parking system with charging function according to an embodiment of the present invention includes an in-out space, a plurality of parking levels 1, a plurality of loading boards 3, and a conveyer, each parking level 1 includes a plurality of parking spaces 11, each parking space 11 has a charging pile 7 and a power supply interface P1 electrically connected with the charging pile 7 disposed therein; each loading board 3 includes a board portion 31 for supporting an electric vehicle 900 thereon, a power receiving interface P2 disposed at the board portion 31, a charging cable 321 electrically connected with the power receiving interface P2 for charging the electric vehicle 900 supported on the board portion 31, and a support foot 34 disposed at a bottom of the board portion 31; the conveyer is configured for transporting the loading board 3 between the in-out space and the parking spaces 11, the conveyer includes a lifting platform for carrying the loading board 3 up and down and a liftable automated guided vehicle 41, the automated guided vehicle 41 is configured to drive to a position under the board portion 31 and support the loading board 3 upward so as to carry the loading board 3, when the loading board 3 is carried to a predetermined position of the corresponding parking space 11, the automated guided vehicle 41 is lowered to make the support foot 34 be supported on the corresponding parking space 11 and the power receiving interface P2 move downward to mate with the corresponding power supply interface Po.

Figure 3:
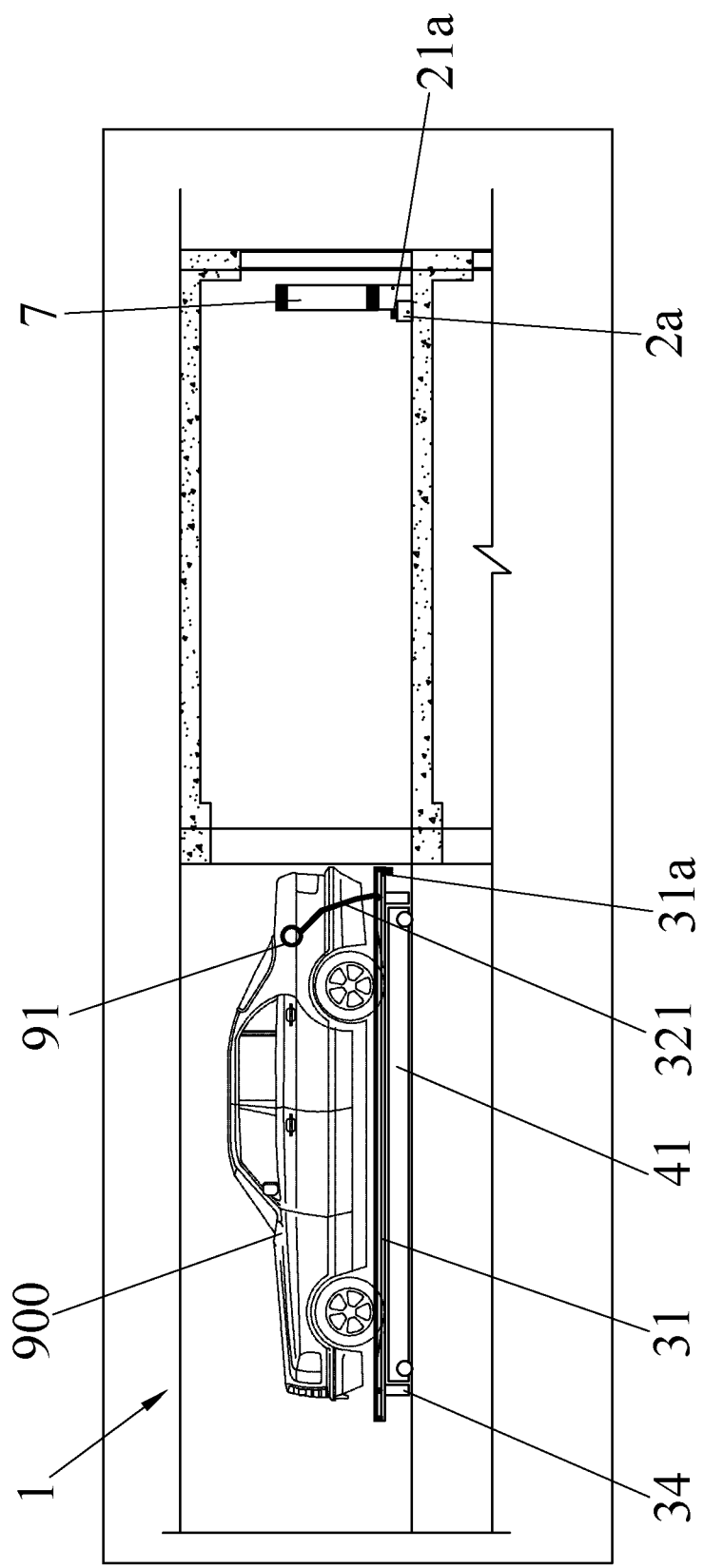
FIG. 3 is a perspective view of a parking level of an automatic parking system with charging function according to an embodiment of the present invention, without electric vehicles parked in parking spaces thereof.

As shown in FIGS. 1 and 3, in this embodiment, the in-out space is positioned in a lifting shaft (not shown), the lifting platform is used as a supporting platform of the in-out space. When the electric vehicle 900 is parked in the loading board 3 positioned in the in-out space by the lifting platform, the lifting platform carries the loading board 3 from the in-out space to the corresponding parking level 1, then the corresponding automated guided vehicle 41 drives to a position under the board portion 31 and support the loading board 3 upward, and then carries the loading board 3 to the corresponding parking space 11 from the lifting platform. When the loading board 3 is carried to a predetermined position of the corresponding parking space 11, the automated guided vehicle 41 is lowered to make the support foot 34 be supported on the corresponding parking space 11 and the power receiving interface P2 move downward to mate with the corresponding power supply interface Po. Then, the automated guided vehicle 41 may leave from the corresponding parking space 11 to a predetermined place, another parking space 11 or the lifting platform once receiving a vehicle parking order or a vehicle unparking order, the automated guided vehicle 41 may stay in the corresponding parking space 11 for waiting the corresponding order in other embodiments. When unparking the electric vehicle 900, the automated guided vehicle 41 drives into the corresponding parking space 11 and is lifted to support the loading board 3 upward so as to make the support foot 34 of the loading board 3 lose the support and the power receiving interface P2 be separated from the corresponding power supply interface P1 and then carries the loading board 3 from the corresponding parking space 11 to the lifting platform, then the lifting platform carries the loading board 3 from the corresponding parking level 1 to the in-out space. In this embodiment, each parking level 1 has the respective automated guided vehicle 41 disposed therein, the automated guided vehicle 41 move between the parking spaces 11 of the corresponding parking level 1 and the lifting platform, which should not be a limitation to the present invention, for example, the automatic parking system may have only one automated guided vehicle 41, which stays on the lifting platform normally, after carrying the loading board 3 to the corresponding parking space 11, the automated guided vehicle 41 move back to the lifting platform. In other embodiments, the in-out space may be not located in the lifting shaft, in this condition, the automated guided vehicle 41 on the lifting platform may carry the loading board 3 between the in-out space and the lifting platform.

Figure 4:
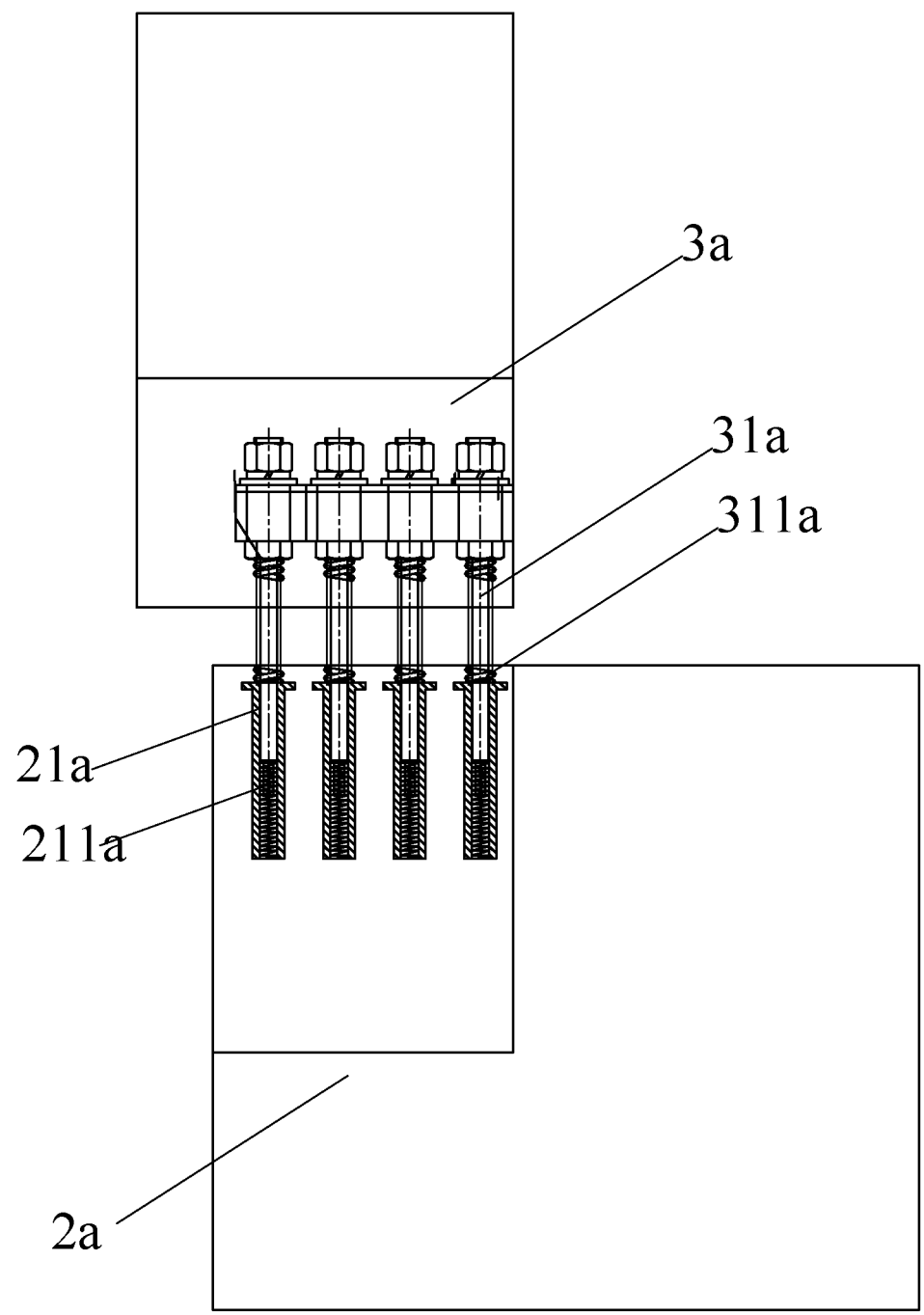
FIG. 4 is a perspective view showing a power plug being mated with a power socket box, according to an embodiment of the present invention.

Referring to FIG. 4, in this embodiment, the power receiving interface P2 is a power plug 3a disposed at the board portion 31, the power supply interface P1 is a power socket box 2a. Specifically, the power plug 3a is disposed at a distal end of a bottom of the board portion 31, when the loading board 3 is carried to a predetermined position of the corresponding parking space 11 and is lowered, the power plug 3a is mated with the corresponding power socket box 2a.

Referring to FIGS. 1 and 4, the power plug 3a includes a plurality of conductive pins 31a, the power socket box 2a includes a plurality of conductive sleeves 21a, the conductive pins 31a are configured to be inserted into the conductive sleeves 21a, respectively. Specifically, each of the conductive sleeves 21a has a first spring 211a disposed therein, each of the conductive pins 31a has a second spring 311a disposed thereon, when the conductive pins 31a are inserted into the corresponding the conductive sleeves 21a, the conductive pins 31a compress the corresponding first springs 211a, and the conductive sleeves 21a compress the corresponding second springs 311a.

Figure 5:
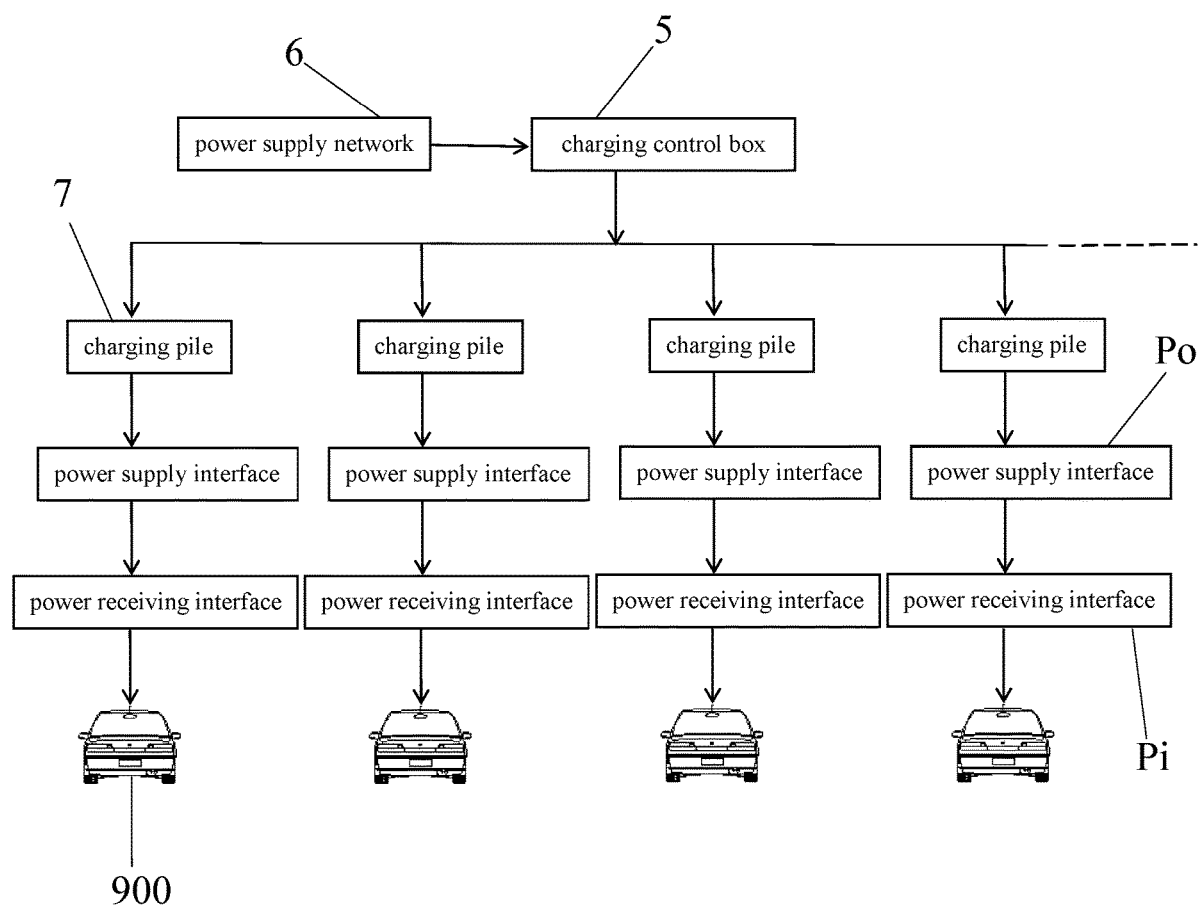
FIG. 5 is a charging schematic diagram of the automatic parking system with charging function according to an embodiment of the present invention.

Referring to FIG. 5, the automatic parking system further includes at least one charging control box 5 which is connected to an external power supply network 6 and electrically connected with the power supply interface P1. Specifically, the charging control box 5 is connected with the corresponding charging pile 7 by a first power cable (not shown), the charging pile 7 is connected to the power socket box 5 by a second power cable (not shown). In this embodiment, one charging control box 5 can be connected with multiple charging piles 7, which should not be a limitation to the present invention, for example, in some embodiments, each charging control box 5 is corresponding to one charging pile 7.

Referring to FIG. 1-5, in this embodiment, when parking and charging the electric vehicle 900, the lifting platform carries the loading board 3 with the electric vehicle 900 thereon to the corresponding parking level 1, then the automated guided vehicle 41 carries the loading board 3 move toward the corresponding parking space 11. When the loading board 3 is carried to a predetermined position of the corresponding parking space 11, the automated guided vehicle 41 is lowered to make the supporting foot 34 of the loading board 3 be supported on the corresponding parking space 11 and the conductive pins 31a of the power plug 3a be mated with the corresponding conductive sleeves 21a of the power socket box 2a, the conductive pins 31a compress the corresponding first springs 211a, and the conductive sleeves 21a compress the corresponding second springs 311a. Then, the power supply network 6 supplies the power to the corresponding charging control box 5, the charging control box 5 supplies the power to the corresponding charging pile 7, the charging pile 7 charges the electric vehicle 900 by the power socket box 2a, the power plug 3a and the charging cable 321 inserted to the charging port of the electric vehicle 900. When unparking the electric vehicle 900, the charging pile 7 is powered off, the automated guided vehicle 41 carries the corresponding loading board 3 from the corresponding parking space 11 to the lifting platform, then the lifting platform carries the corresponding loading board 3 to the in-out space.

Specifically, the automatic parking system further includes an automated door (not shown), the automated door is disposed at the in-out space, the automated door is electrically connected with a swipe equipment (not shown), when the automated door is opened, the electric vehicle 900 is driven into or out from the in-out space.

Specifically, the charging pile 7 has a billing machine for recording the charging charges in real time.

Referring FIG. 1-5, the present invention provides a parking and charging method of the automatic parking system with charging function. The parking and charging method includes: connect the charging cable 321 to a charging port of the electric vehicle 900 parked on the loading board 3 positioned in the in-out space by the lifting platform; carry the loading board 3 with the electric vehicle 900 supported thereon to the corresponding parking level 1 by the lifting platform; lift the automated guided vehicle 41 under the loading board 3 to support the loading board 3; carry the loading board 3 to the corresponding parking space 11 by the automated guided vehicle 41; lower the automated guided vehicle 41 to make the supporting foot 34 be supported on the corresponding parking space 11 and the power receiving interface P2 move downward to mate with the corresponding power supply interface Po, when the loading board 3 is carried to a predetermined position of the corresponding parking space 11; and charge the electric vehicle 900 by the charging pile 7, once detecting that the power receiving interface P2 and the corresponding power supply interface P1 are mated with each other.

Preferably, once detecting that the electric vehicle 900 is charged completely, the charging pile 7 is powered off.

Preferably, once receiving a vehicle unparking order, the charging pile 7 is powered off.

Preferably, once receiving a vehicle unparking order, the automated guided vehicle 41 drives into the corresponding parking space 11 and then is lifted to make the corresponding loading board 3 move upward and the power receiving interface P2 be separated from the corresponding power supply interface Po.

Referring FIGS. 1-5, next, the parking and charging specific process and the unparking specific process of the automatic parking system with charging function will be described according to this embodiment of the present invention, which should not be a limitation to the present invention.

First, the electric vehicle 900 is driven to the loading board 3 positioned in the in-out space; then, the electric vehicle 900 is turned off, the doors and the windows of the electric vehicle 900 is closed, the charging cable 321 is connected to the charging port 91 of the electric vehicle 900; then, the swipe equipment receives a card information which makes the automated door be closed; then, the lifting platform carries the loading board 3 from the in-out space to the corresponding parking level 1; then, the automated guided vehicle 41 carries the loading board 3 to the corresponding parking space 11 from the lifting platform. When the loading board 3 is carried to a predetermined position of the corresponding parking space 11, the automated guided vehicle 41 is lowered to make the support foot 34 be supported on the corresponding parking space 11 and the power plug 3a move downward to mate with the corresponding power socket box 2a. Once detecting the power plug 3a and the power socket box 2a is mated with each other, the charging control box 5 supplies the power to the electric vehicle 900 by the charging pile 7. Specifically, once detecting the electric vehicle 900 is charged completely, the charging pile 7 is powered off.

Once receiving a vehicle unparking order, the charging pile 7 is powered off; then the lifting platform is moved to the corresponding parking level 1 where the corresponding electric vehicle 900 is parked; then the automated guided vehicle 41 carries the loading board 3 where the corresponding electric vehicle 900 is parked from the corresponding parking space 11 to the lifting platform; then the lifting platform carries the loading board 3 to the in-out space; then, the automated door is opened, the electric vehicle 900 can be driven out after the charging cable 321 is taken off and the charging charges are paid.

In comparison with the prior art, the automatic parking system with charging function of the present invention only needs to drive the electric vehicle 900 into the in-out space and connect the charging cable 321 to the electric vehicle 900, then the lifting platform will carry the loading board 3 with the electric vehicle 900 thereon to the corresponding parking level 1, then the automated guided vehicle 41 is lifted to support the loading board 3 and then carries the loading board 3 to the corresponding parking space 11, when the loading board 3 is carried to a predetermined position of the corresponding parking space 11, the automated guided vehicle 41 is lowered to make the support foot 34 be supported on the corresponding parking space 11 and the power receiving interface P2 move downward to mate with the corresponding power supply interface Po, then the charging pile 7 will charge the corresponding electric vehicle 900. When unparking the electric vehicle 900, the automated guided vehicle 41 and the lifting platform will carry the corresponding electric vehicle 900 to the in-out space once receiving a vehicle unparking order. Therefore, the automatic parking system with charging function of the present invention can park and charge multiple electric vehicle 900 simultaneously, which solves the problem that the electric vehicles 900 are difficult to be charged.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An automatic parking system with charging function, comprising:
    an in-out space;
    a plurality of parking levels, each parking level comprising a plurality of parking spaces, each parking space having a charging pile and a power supply interface electrically connected with the charging pile;
    a plurality of loading boards, each loading board comprising a board portion for supporting an electric vehicle thereon, a power receiving interface disposed at the board portion, a charging cable disposed at the board portion and electrically connected with the power receiving interface for charging the electric vehicle supported on the board portion, and a support foot disposed at a bottom of the board portion; and
    a conveyer for transporting the loading boards between the in-out space and the parking spaces, the conveyer comprising a lifting platform for carrying the loading boards up and down and a liftable automated guided vehicle, the automated guided vehicle being configured to drive to a position under the board portion and support the loading board upward so as to carry the loading board, when the loading board is carried to a predetermined position of the corresponding parking space, the automated guided vehicle being lowered to make the support foot be supported on the corresponding parking space and the power receiving interface move downward to mate with the corresponding power supply interface.

2. The automatic parking system with charging function according to claim 1, wherein the power receiving interface is a power plug disposed at the board portion, the power supply interface is a power socket box.

3. The automatic parking system with charging function according to claim 2, wherein the power plug comprises a plurality of conductive pins, the power socket box comprises a plurality of conductive sleeves, the conductive pins are configured to be inserted into the conductive sleeves, respectively.

4. The automatic parking system with charging function according to claim 3, wherein each of the conductive sleeves has a first spring disposed therein, each of the conductive pins has a second spring disposed thereon, when the conductive pins are inserted into the corresponding conductive sleeves, the conductive pins compress the corresponding first springs, and the conductive sleeves compress the corresponding second springs.

5. The automatic parking system with charging function according to claim 1, further comprising at least one charging control box which is connected to an external power supply network and electrically connected with the power supply interface.

6. The automatic parking system with charging function according to claim 5, wherein the charging control box is connected with the power supply interface by a power cable.

7. The automatic parking system with charging function according to claim 1, each of the parking levels has the respective automated guided vehicle disposed therein.

8. A parking and charging method of an automatic parking system with charging function, the automatic parking system comprising:
    an in-out space;
    a plurality of parking levels, each parking level comprising a plurality of parking spaces, each parking space having a charging pile and a power supply interface electrically connected with the charging pile;
    a plurality of loading boards, each loading board comprising a board portion for supporting an electric vehicle thereon, a power receiving interface disposed at the board portion, a charging cable disposed at the board portion and electrically connected with the power receiving interface for charging the electric vehicle supported on the board portion, and a support foot disposed at a bottom of the board portion; and
    a conveyer for transporting the loading boards between the in-out space and the parking spaces, the conveyer comprising a lifting platform for carrying the loading boards up and down and a liftable automated guided vehicle, the automated guided vehicle being configured to drive to a position under the board portion and support the loading board upward so as to carry the loading board, when the loading board is carried to a predetermined position of the corresponding parking space, the automated guided vehicle being lowered to make the support foot be supported on the corresponding parking space and the power receiving interface move downward to mate with the corresponding power supply interface;
    and the parking and charging method comprising:
    connecting the charging cable to a charging port of the electric vehicle parked on the loading board positioned in the in-out space by the lifting platform;
    carrying the loading board with the electric vehicle supported thereon to the corresponding parking level by the lifting platform;
    lifting the automated guided vehicle under the loading board to support the loading board;
    carrying the loading board to the corresponding parking space by the automated guided vehicle;
    lowering the automated guided vehicle to make the supporting foot be supported on the corresponding parking space and make the power receiving interface move downward to mate with the corresponding power supply interface, when the loading board is carried to a predetermined position of the corresponding parking space; and
    charging the electric vehicle by the charging pile, once detecting that the power receiving interface and the corresponding power supply interface are mated with each other.

9. The parking and charging method according to claim 8, further comprising powering off the charging pile once detecting that the electric vehicle is charged completely.

10. The parking and charging method according to claim 8, further comprising powering off the charging pile once receiving a vehicle unparking order.

11. The parking and charging method according to claim 8, further comprising enabling the automated guided vehicle to drive into the corresponding parking space and then be lifted to make the corresponding loading board move upward and the power receiving interface be separated from the corresponding power supply interface, once receiving a vehicle unparking order.

* * * * *